United States Patent
Sharma et al.

(10) Patent No.: US 12,101,356 B2
(45) Date of Patent: Sep. 24, 2024

(54) HIGH PERFORMANCE ARCHITECTURE FOR CONVERGED SECURITY SYSTEMS AND APPLIANCES

(71) Applicant: Avago Technologies International Sales Pte. Limited, Singapore (SG)

(72) Inventors: Rajan Sharma, San Jose, CA (US); Mark Birman, Los Altos, CA (US); Laxminarasimha Rao Kesiraju, East Palo Alto, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 294 days.

(21) Appl. No.: 17/587,739

(22) Filed: Jan. 28, 2022

(65) Prior Publication Data

US 2023/0247054 A1 Aug. 3, 2023

(51) Int. Cl.
*H04L 9/00* (2022.01)
*H04L 9/40* (2022.01)
*H04L 49/1546* (2022.01)

(52) U.S. Cl.
CPC .......... *H04L 63/20* (2013.01); *H04L 49/1546* (2013.01)

(58) Field of Classification Search
CPC . H04L 63/20; H04L 49/1546; H04L 63/0209; G06N 20/00
See application file for complete search history.

(56) References Cited

U.S. PATENT DOCUMENTS

| | | | | |
|---|---|---|---|---|
| 7,689,821 | B2* | 3/2010 | Bailey | G06F 13/4068 713/1 |
| 2005/0108518 | A1* | 5/2005 | Pandya | H04L 63/20 713/153 |
| 2007/0183433 | A1 | 8/2007 | Xie et al. | |
| 2008/0130894 | A1 | 6/2008 | Qj et al. | |
| 2010/0161959 | A1 | 6/2010 | Sood | |

OTHER PUBLICATIONS

"A Survey on the Application of FPGAs for Network Infrastructure Security", Hao Chen et al.; IEEE Communications surveys & tutorials, IEEE, USA vol. 13, No. 4, Oct. 1, 2011 pp. 541-561, SP011387773, ISSN: 1553-877X.
European Extended Search Report EP (Application No. 22216708.2-1213 dated Jun. 6, 2023.

* cited by examiner

*Primary Examiner* — Daniel B Potratz
*Assistant Examiner* — Syed M Ahsan
(74) *Attorney, Agent, or Firm* — Foley & Lardner LLP

(57) ABSTRACT

In some aspects, the disclosure is directed to methods and systems for providing an architecture for building high performance silicon components that support a rich set of networking and security features. In many implementations, the architecture splits network and security functions into two functional and logical blocks (which may physically be on the same die or integrated circuit in some implementations, or may be split on separate integrated circuits). The network functions may be executed via an integrated network interface card and accelerator subsystem with a high throughput execution pipeline. Security functions may be executed asynchronously from the network processing functions, in many implementations.

15 Claims, 9 Drawing Sheets

HIGH PERFORMANCE ARCHITECTURE FOR CONVERGED SECURITY SYSTEMS AND APPLIANCES

FIELD OF THE DISCLOSURE

This disclosure generally relates to systems and methods for network communications. In particular, this disclosure relates to systems and methods for providing a high performance architecture for converged security systems and appliances.

BACKGROUND OF THE DISCLOSURE

Communications appliances provide various networking and security features, including switching and routing, traffic management, cryptographic features (e.g. encryption and decryption, authentication, etc.), filtering, and other such functions. With network throughputs exceeding terabits per second, implementations of these complex systems utilizing many discrete components suffer from bottlenecks. While some manufacturers have attempted configurations with fewer, specialized components to increase throughput, this sacrifices flexibility and adds significant expense, as the systems cannot individually perform all of the various functions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
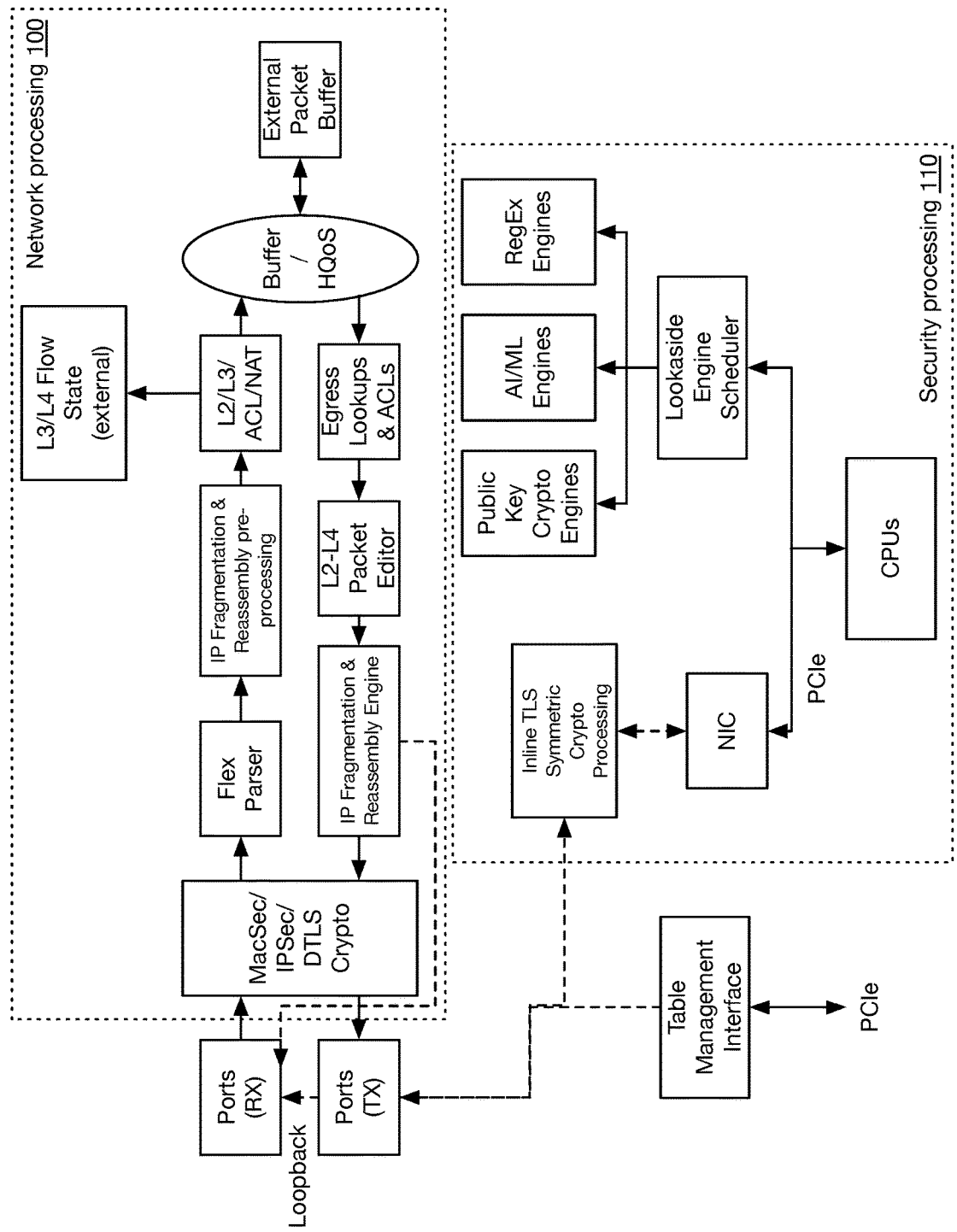
FIG. 1 is a block diagram of an implementation of an architecture for converged security systems and appliances.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for providing a high performance architecture for converged security systems and appliances; and Section B describes a network environment and computing environment which may be useful for practicing embodiments described herein.

A. High Performance Architecture for Converged Security Systems and Appliances

Communications appliances provide various networking and security features, including switching and routing, traffic management, cryptographic features, filtering, and other such functions. With network throughputs exceeding terabits per second, implementations of these complex systems utilizing many discrete components suffer from bottlenecks. While some manufacturers have attempted configurations with fewer, specialized components to increase throughput, this sacrifices flexibility and adds significant expense, as the systems cannot individually perform all of the various functions.

For example, systems offering networking and security features may be built with an assortment of components, including:

Switch/Router components (e.g., ASICs) to perform networking and traffic management at high data rates;

Cryptographic accelerator components to perform public key and symmetric encryption offload;

Regular expression search (REGEX) acceleration components to perform pattern searches at high rate;

General purpose central processing units (CPUs) for management, data processing and other functions'

Network interface cards (NICs) to allow traffic to traverse between the networking domain and the general-purpose CPU domain; and Field Programmable Gate Arrays (FPGAs) to implement many of the above functions, as well as specialized logic/control functions that allow the system to operate as a coherent whole.

Using a plethora of different component types makes such systems complex, expensive, and prone to performance limitations. The overall performance of a given system is often constrained by bottlenecks in specific components. Very few, if any, of these components are purpose-built for such types of systems. From a business perspective, there is a lack of merchant silicon solutions that specifically target such use cases. Thus, given the widespread prevalence of Internet connectivity and Web-based applications, there is a strong demand for systems and appliances that support a convergence of data networking and data security functions, at high data rates.

present disclosure is directed to systems and methods for providing an architecture for building high performance silicon components that support a rich set of networking and security features. The architecture is highly scalable, addressing the bottleneck issues discussed above and providing very high throughput. Additionally, the architecture utilizes fungible blocks or functional elements that may be programmed to perform various functions without sacrificing flexibility or performance. Many functions are hardware accelerated, if appropriate, while others are under control of general purpose processors. In particular, in many implementations, the architecture splits network and security functions into two functional and logical blocks (which may physically be on the same die or integrated circuit in some implementations, or may be split on separate integrated circuits). The network functions may be executed via an integrated NIC and accelerator subsystem with a high throughput execution pipeline (e.g. 2 Tbps or higher, in many implementations). In many implementations, the network functions may use a single clock for processing (for example, distributed amongst a plurality of functional network processing blocks). The security functions may be executed via the same or a separate clock, in many implementations. For example, the security functions may be executed asynchronously from the network processing functions, in many implementations.

FIG. 1 is a block diagram of an implementation of an architecture for converged security systems and appliances, including a network processing subsystem 100 (sometimes referred to as a network processor or network processor subsystem) and security processing subsystem 110 (sometimes referred to as a security processor or security processor subsystem). Although sometimes referred to as a processor, in many implementations, each of network processor 100 and security processor 110 may comprise a plurality of sub- or co-processors, as well as function-dedicated hardware circuits such as FPGAs or ASICs, sometimes referred to as network processing engines or security processing engines. As shown, incoming data packets from an input (e.g. receive port) may be processed by a network processor 100 with high-throughput network components including serializer/deserializer/Ethernet MAC/Port blocks; programmable packet parsers or filters including parsers capable of classifying packet headers or portions of headers at any layer of the network stack (e.g. layer 2, layer 3, layer 4, etc.); programmable packet lookup engines to implement layer 2 and layer 3 features such as IP fragmentation and assembly, network address translation, access control lists, etc.; programmable packet editors for packet modifications (e.g. modifying header fields including type-length-value (TLV) encoded headers, modifying addresses or sequence numbers, or otherwise modifying packets); large scale stateful flow and ACL processing (with large storage arrays for managing or maintaining large numbers of flow states simultaneously); a deep-buffer Traffic Manger with support for Hierarchical QoS; and an integrated fabric interface for building distributed, chassis-based systems (discussed in more detail below).

Each functional block of the network processing 100 may comprise hardware, software, or a combination of hardware and software, and as discussed above, may execute on a single distributed clock (which may be on-die or off-die in various implementations) in an isochronous manner, in many implementations. Such a network processing pipeline may be very high throughput, capable of handling 2 Tbps or higher in many implementations, and millions or hundreds of millions of simultaneous network flows (maintaining state as needed for network address translation, load balancing, TCP connection tracking, etc.).

Security processor 110 may, in many implementations, operate asynchronously from network processing 100, and frequently with a lower throughput. Accordingly, security processor 110 may also comprise a second distributed clock (which may be on-die or off-die in various implementations), and/or may operate at a different clock rate than a clock of network processor 100. However, as not all packets need additional security processing features, offloading these functions to the parallel die may allow the primary pipeline to not be bottlenecked, increasing overall system throughput. Additionally, in many implementations, the network processor 100 and security processor 110 may have different manufacturing parameters: for example, in some implementations, network processor 100 and security processor 110 may have different construction scales (e.g. 5 nm or 7 nm processes in some implementations, for example).

Security processor 110 may comprise a plurality of sub- or co-processors, as well as function-dedicated hardware circuits such as FPGAs or ASICs for security acceleration, including a plurality of sub- or co-processors, as well as function-dedicated hardware circuits such as FPGAs or ASICs for: IPSEC symmetric encryption and decryption; MACsec symmetric encryption and decryption; DTLS symmetric encryption and decryption; TLS symmetric encryption and decryption; TLS public key encryption and decryption; Regular Expression Search (REGEX) accelerators; Machine learning/Artificial Intelligence inference engines; Integrated Network Interface Controllers for packets to/from CPU; and integrated and/or external CPUs. For example, in some implementations, security processor 110 may include lookaside engines for matching encryption or decryption keys, performing hashes or other calculations. As these processes may be resource intensive and time-consuming, offloading their functionality to security processor 110 allows packet flows that do not need the additional security features to flow through network processor 100 at full speed. The components of security processor 110 and network processor 100 may exchange data via any suitable means, such as a shared memory bus or storage device (e.g. RAM or flash memory), and/or via an Ethernet, fabric, or PCI switch or bridge. For example, in some implementations, packets may be forwarded by network processor 100 to an internal or virtual address of the security processor 110 for processing.

In many implementations, network processing subsystem 100 and security processing subsystem 110 may be deployed on or supported by a single card (e.g. PCIe card or similar interface) for installation in a server or other data backplane. In other implementations, network processing subsystem 100 and security processing subsystem 110 may be divided between separate cards (including, in some implementations, a mother and daughter card), allowing for separate deployment (discussed in more detail below).

As shown in FIG. 1, implementations of the architecture deploy these various elements in an integrated way to enable efficient implementation of high-performance networking and security systems. The sequence of operations, as well as the capacities and performance of the various elements are tuned to result in consistent and differentiated performance across various use cases. Accordingly, such implementations provide a scalable architecture that can address multiple throughput/performance points with programmable, fungible elements that do not sacrifice flexibility for performance.

Figure 2:
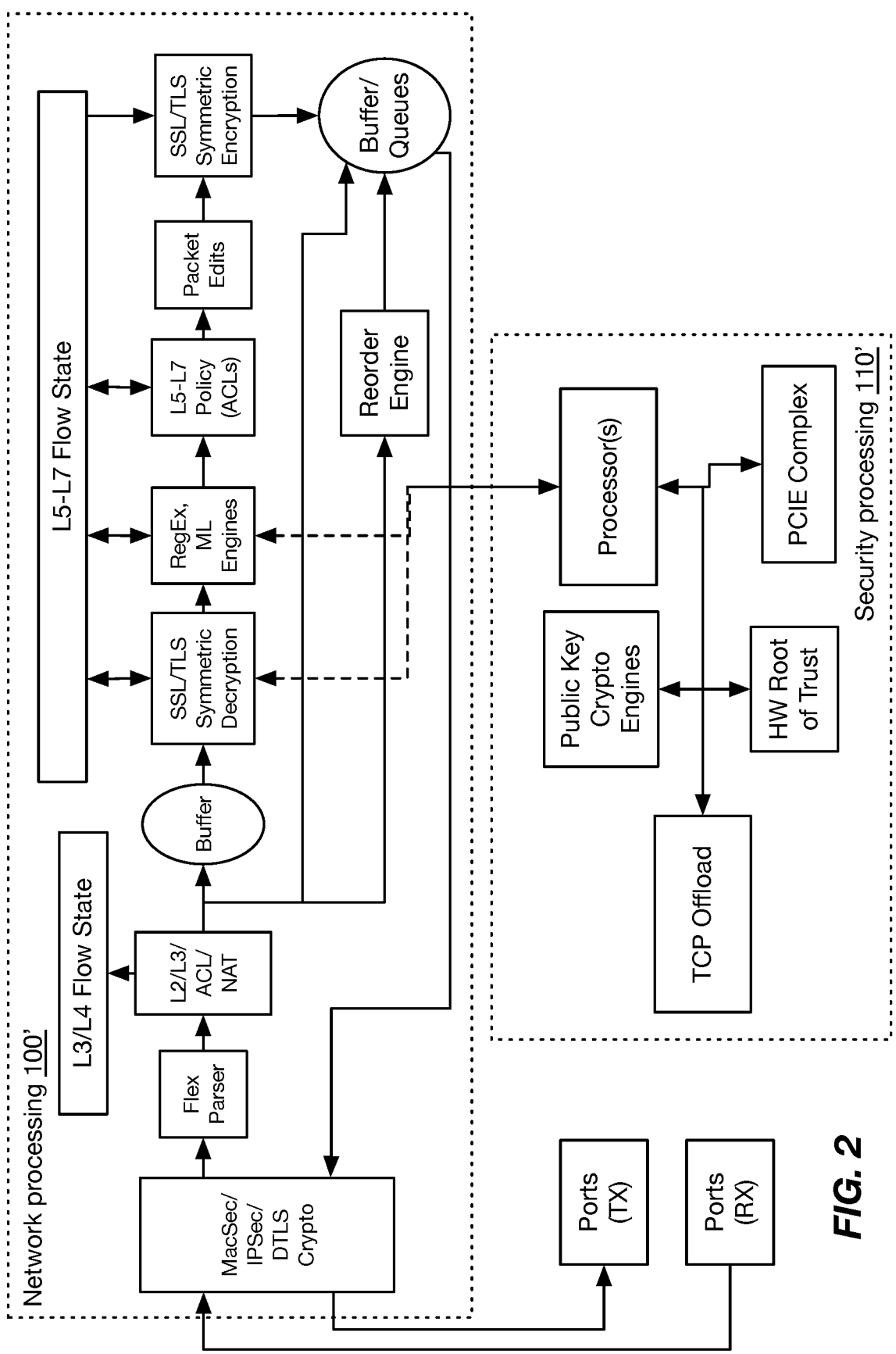
FIG. 2 is a block diagram of another implementation of an architecture for converged security systems and appliances.

FIG. 2 is a block diagram of another implementation of an architecture for converged security systems and appliances. Similar to FIG. 1, the network processor 100' is split from security processor 110'. However, as shown, sidechain information obtained from decryption and RegEx or machine learning engines in the network processor 100' may be provided to security processor 110' in some implementations, potentially reducing processing requirements by the security processor 110'. For example, network flows that have been classified by a RegEx of the network processor 100' (e.g. for application layer classification for QoS or for malicious packet detection) may have their classification information passed to security processor 110' for further processing (e.g. for decryption for deep packet inspection, configuration of filters, etc.).

FIGS. 3A-3E are block diagrams of deployment configurations for implementations of an architecture for converged security systems and appliances. For example, referring first to FIG. 3A, an integrated network/security processor 310

(sometimes referred to as a network/security processing system or engine, and comprising one or more network processors 100 and one or more security processors 110) may be coupled to one or more physical interfaces 300 (e.g. Ethernet, WiFi hardware, optical fiber interfaces, etc.), and one or more central processing units 320 (e.g. via a PCIe interface). The network/security processor 310 may provide an integrated solution with large input/output capability, large flow scales, and cryptographic processing capabilities that can be offloaded from CPUs 320. The integrated network/security processor 310 may be deployed in a chassis, in some implementations, such as a 1U or 2U rackmount server chassis (or any other suitable form factor). In such implementations, the chassis may contain or support additional components, such as power supplies, front or back panel ports (e.g. Ethernet or fiber ports for physical interfaces 300), or other such features. In some implementations, the chassis may include a PCIe backplane or similar interface through which network/security processor 310 may be connected.

Figure 3A:
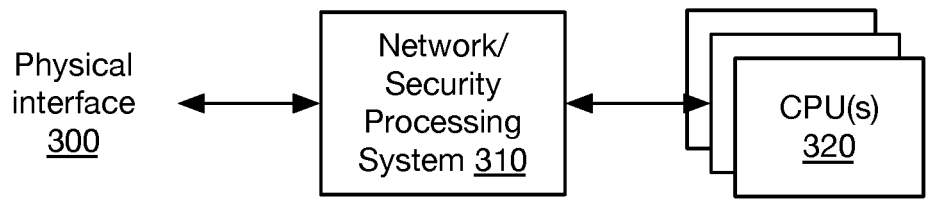
FIGS. 3A-3E are block diagrams of deployment configurations for implementations of an architecture for converged security systems and appliances.
Figure 3B:
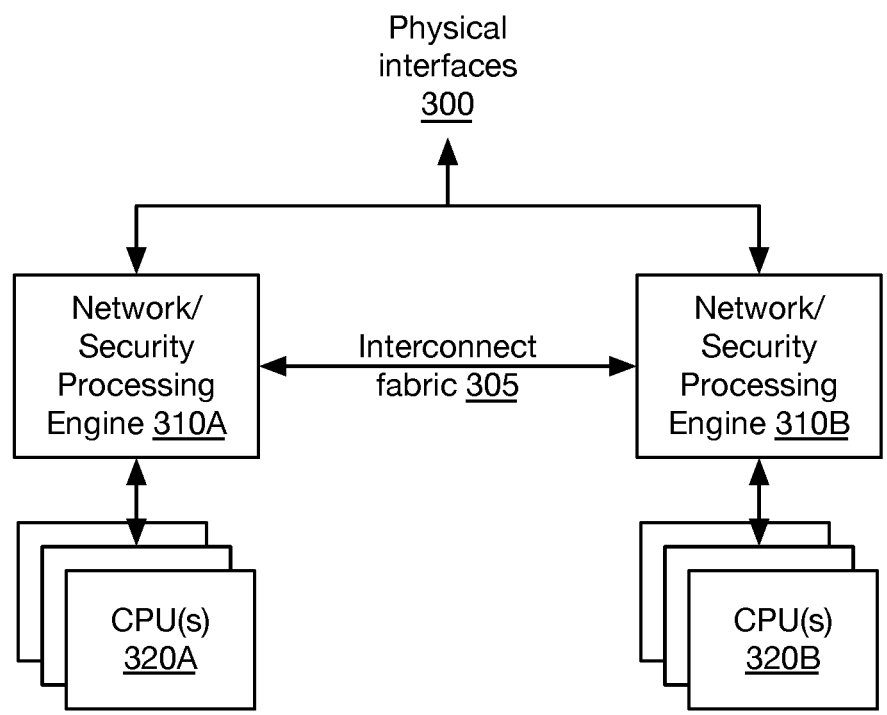

In some implementations, multiple integrated network/security processors 310 may be deployed in a single appliance or chassis, as shown in the block diagram of FIG. 3B. For example, a plurality of integrated network/security processors 310 (310A, 310B) may be coupled to a corresponding plurality of physical interfaces 300 (e.g. separate physical ports, in many implementations) and CPUs (320A, 320B), and coupled via an interconnect fabric interface 305 (e.g. as separate cards or blades in a server or appliance chassis). In some implementations, steering of flows to each integrated network/security processor 310 may be balanced between the integrated network/security processors 310 (e.g. such that each processor 310 performs flow processing for half of the physical interfaces). In some implementations, the security processing functions may be shared between the network processors of each integrated network/security processor 310, such that a security processor of a first integrated network/security processors 310A may perform cryptographic processing for a network processor of a second integrated network/security processors 310, with packet data passed between each processor 310 via interconnect fabric 305. This may be particularly helpful to balance processing loads between each security processor of the integrated network/security processors 310.

Figure 3C:
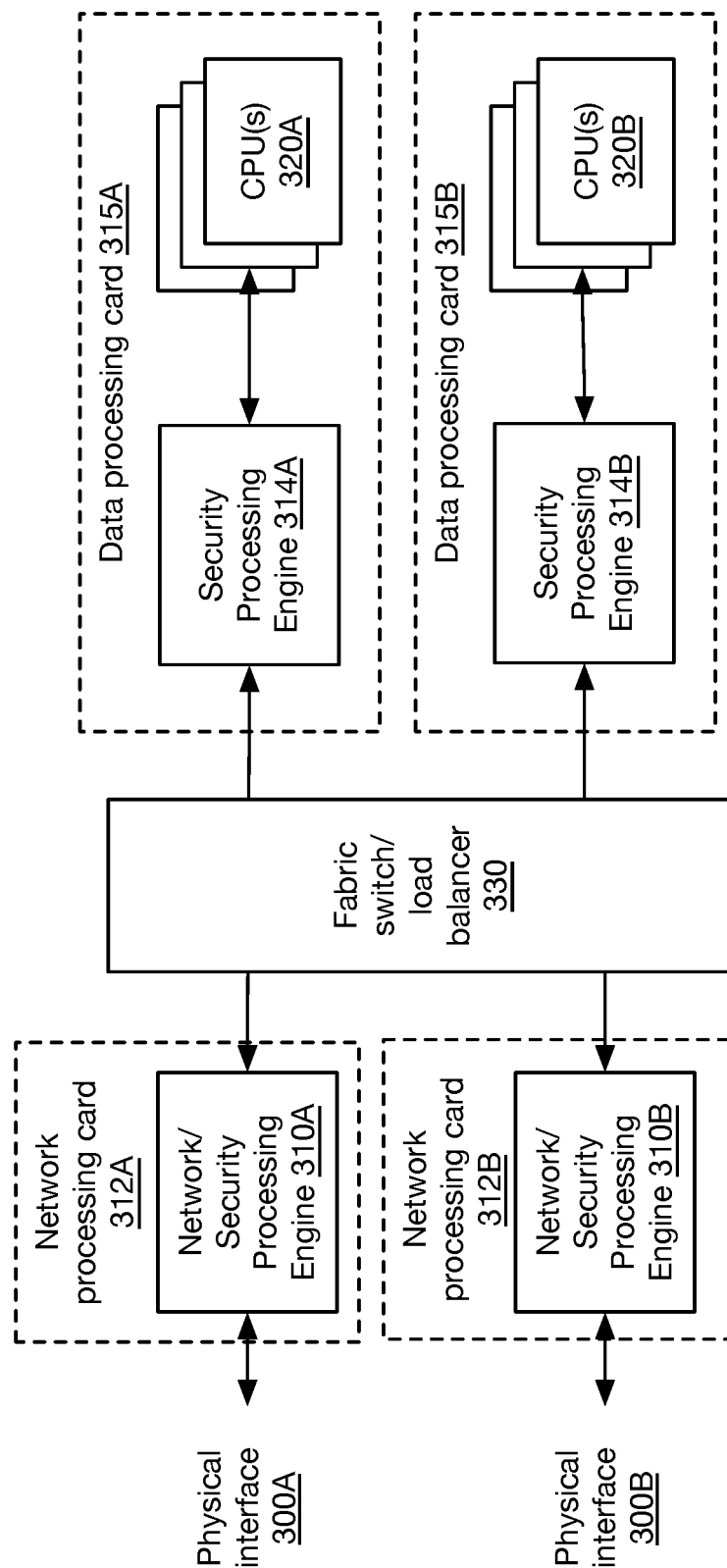

FIG. 3C shows a similar implementation with integrated network/security processors 310 separated into corresponding network processing cards 312A, 312B and security or data processing cards 315A, 315B. In some implementations, as shown, each network processing card 312A, 312B may comprise an integrated network/security processor 310A, 310B. Security functions (including lookaside offloads, machine learning analysis, etc.) may be provided by the security processor 110 of each integrated network/security processor 310, and/or may be separately provided by stand-alone security processors 314A, 314B (which may each comprise a security processor 110). A fabric switch and/or load balancer 330 may provide load balancing between data processing cards 315A, 315B.

Figure 3D:
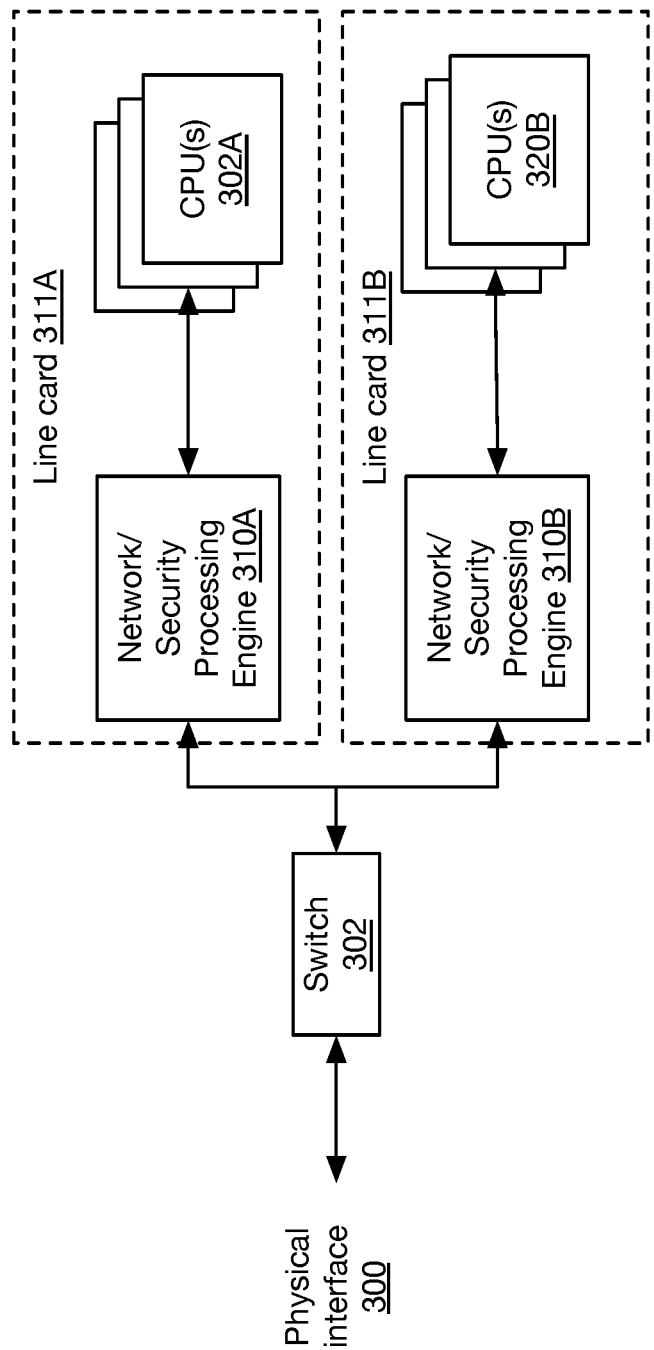

FIG. 3D shows an implementation scaling out the example of FIG. 3A with separate line cards 311A, 311B (or more) each comprising an integrated network/security processor 310 and one or more CPUs 320 for data processing, with an external switch 302 distributing traffic to each card. Such an implementation may be relatively inexpensive to manufacture (with each card being identical), and may allow for high scalability, as well as providing greater reliability (e.g. with "hot" backup cards in some implementations).

Figure 3E:
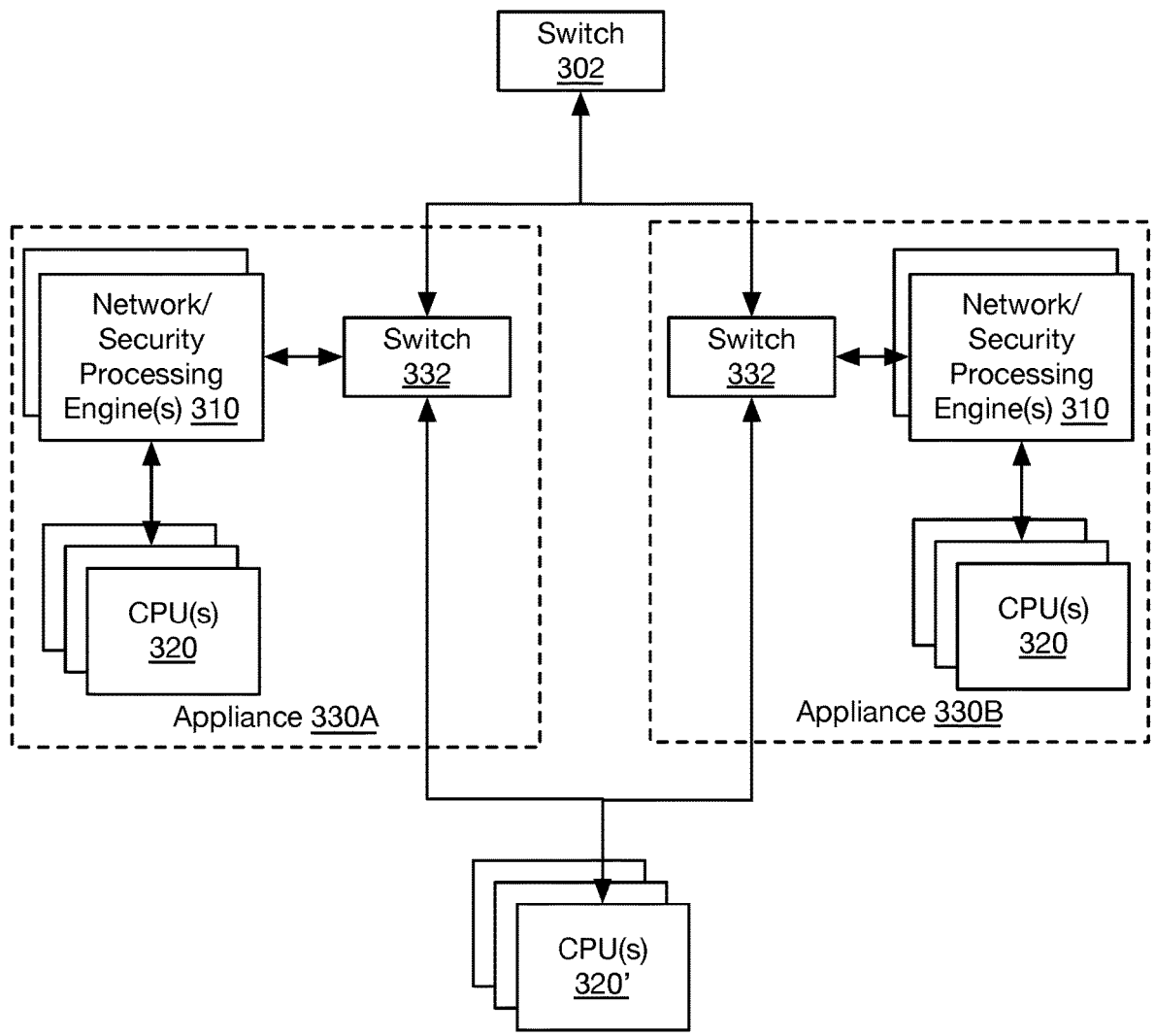

Similarly, FIG. 3E shows an implementation with separate appliances 330A, 330B connected via an external switch 302 (e.g. a top of rack switch or ToR switch), as well as internal switches 332 providing load balancing amongst a plurality of integrated network/security processors 310. Processed packet flows may be provided to external server CPUs 320' (e.g. application servers, data servers, or other computing devices), allowing for easy deployment of the integrated network/security processors 310 as intermediary devices in a network rack or similar environment.

In some aspects, the present disclosure is directed to a system for high-throughput network and security processing. The system includes a network processing subsystem comprising a plurality of interconnected network processing engines configured in a single pipeline; and a security processing subsystem, coupled to and external from the network processing subsystem, comprising a plurality of interconnected security processing engines.

In some implementations, the network processing subsystem comprises a first clock, and wherein the security processing subsystem comprises a second clock. In some implementations, the network processing subsystem operates at a first clock rate, and wherein the security processing subsystem operates at a second clock rate. In some implementations, the system includes a memory bus shared by at least one network processing engine of the network processing subsystem and at least one security processing engine of the security processing subsystem.

In some implementations, the network processing subsystem and security processing subsystem are coupled via an Ethernet interface. In a further implementation, the system includes an Ethernet switch managing packet flow between the network processing subsystem and security processing subsystem. In some implementations, the system includes a fabric interconnect interface coupled to at least one of the network processing subsystem and the security processing subsystem.

In some implementations, the system includes a single card supporting the network processing subsystem and the security processing subsystem. In some implementations, the system includes a second network processing subsystem, a second security processing subsystem, and a network switch coupled to each of the first network processing subsystem, the first security processing subsystem, the second network processing subsystem, and the second security processing subsystem, the network switch configured to load balance security processing for each of the first network processing subsystem and the second network processing subsystem between the first security processing subsystem and the second security processing subsystem.

In some implementations, the plurality of interconnected security processing engines are configured in a corresponding plurality of parallel processing pipelines.

In another aspect, the present disclosure is directed to an appliance, comprising: a chassis; one or more physical communication interfaces positioned on a portion of the chassis; a network processing subsystem positioned within the chassis and coupled to the one or more physical communication interfaces, comprising a plurality of interconnected network processing engines configured in a single pipeline; and a security processing subsystem positioned within the chassis, coupled to and external from the network processing subsystem, comprising a plurality of interconnected security processing engines.

In some implementations, the appliance includes a communications backplane positioned within the chassis, and wherein the network processing subsystem is coupled to the one or more physical communication interfaces via the communications backplane. In a further implementation, the network processing subsystem and the security processing subsystem are supported on a single card. In a still further implementation, the appliance includes a second network processing subsystem and a second security processing subsystem, supported on a second single card and coupled to the one or more physical communication interfaces via the communications backplane. In a yet still further implementation, the appliance includes a fabric switch positioned within the chassis, the fabric switch managing packet flow across the communications backplane.

In some implementations, the network processing subsystem operates at a first clock rate, and wherein the security processing subsystem operates at a second clock rate. In some implementations, the appliance includes a memory bus shared by at least one network processing engine of the network processing subsystem and at least one security processing engine of the security processing subsystem. In some implementations, the network processing subsystem and security processing subsystem are coupled via an Ethernet or fabric interface.

B. Computing and Network Environment

Figure 4A:
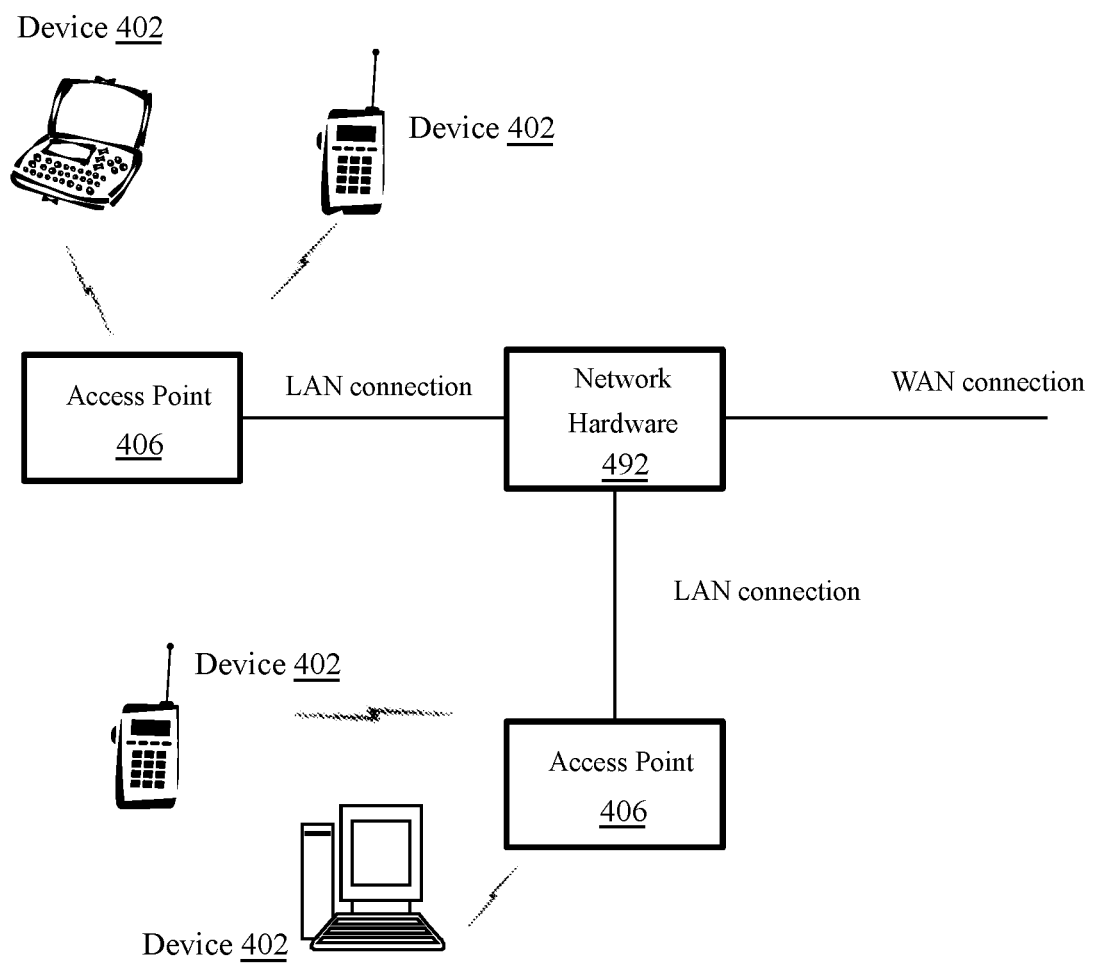
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a standalone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
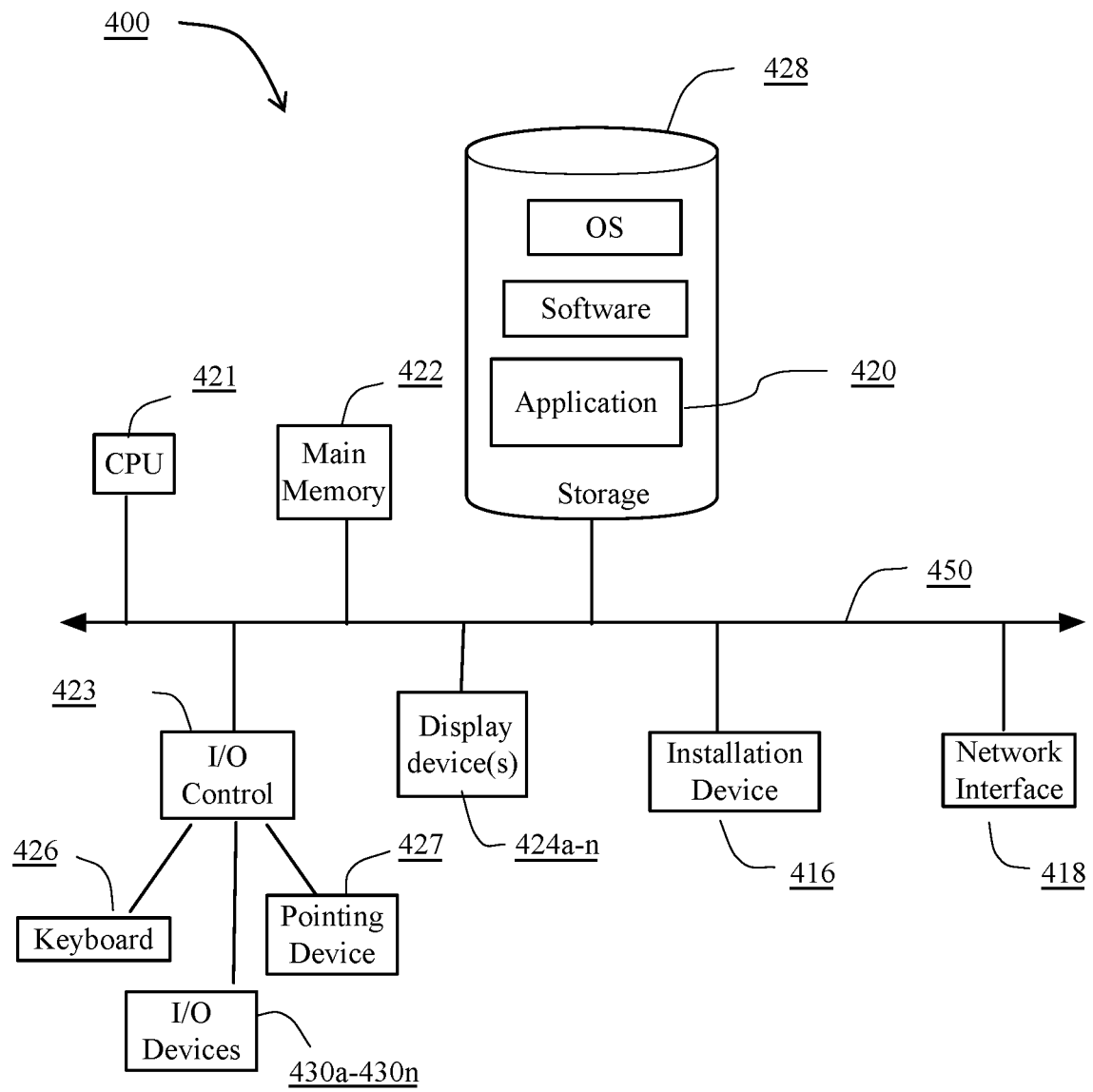
FIGS. 4B and 4C are block diagrams depicting embodiments of computing devices useful in connection with the methods and systems described herein.
Figure 4C:
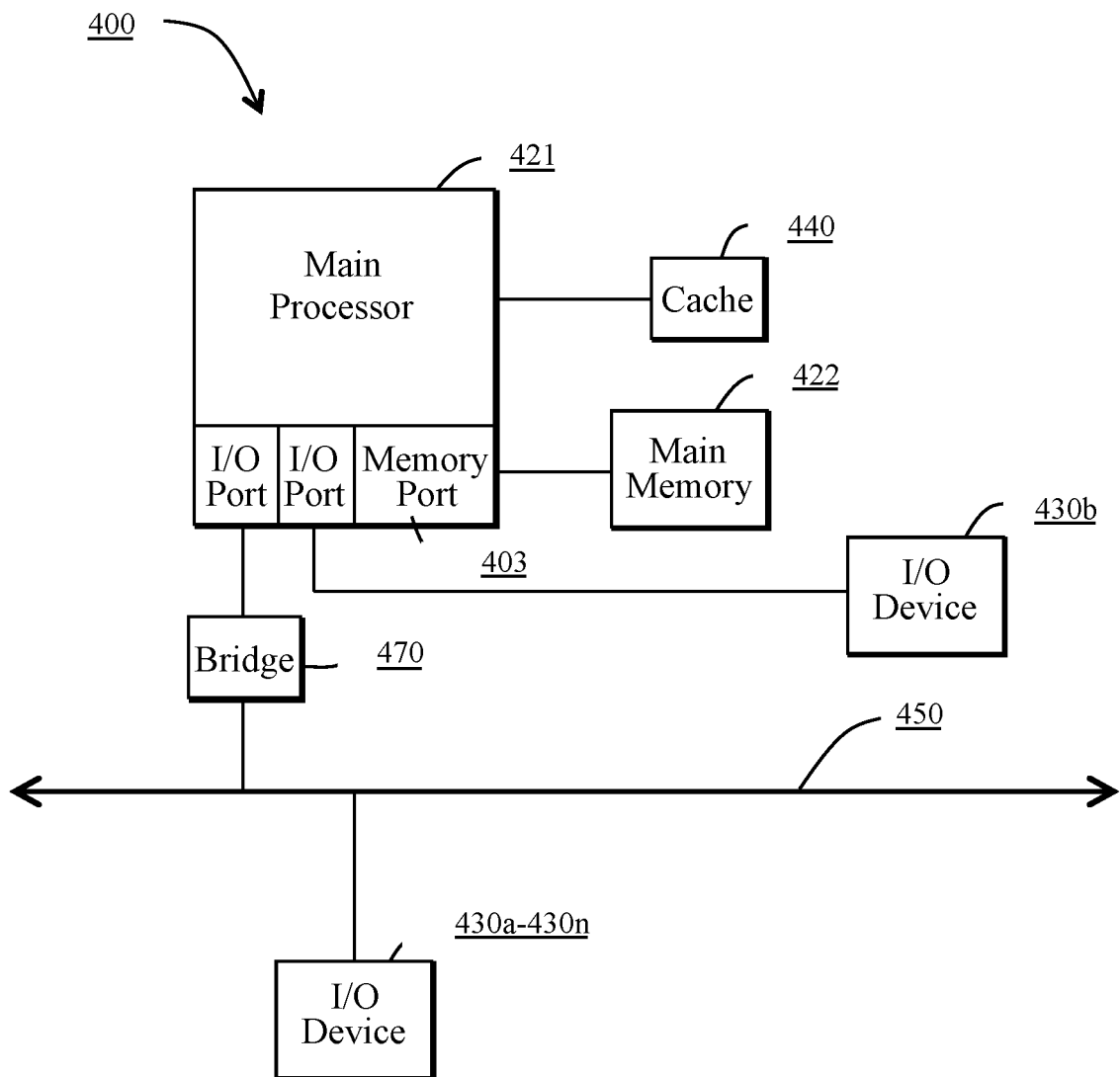

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, California.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for high-throughput network and security processing, comprising:
a network processing subsystem comprising a plurality of interconnected network processing engines configured in a single pipeline;
a security processing subsystem, coupled to and external from the network processing subsystem, comprising a plurality of interconnected security processing engines;
a second network processing subsystem;
a second security processing subsystem;
a network switch coupled to each of the first network processing subsystem, the first security processing subsystem, the second network processing subsystem, and the second security processing subsystem; and
wherein the network switch is configured to load balance security processing for each of the first network processing subsystem and the second network processing subsystem between the first security processing subsystem and the second security processing subsystem.

2. The system of claim 1, wherein the network processing subsystem comprises a first clock, and wherein the security processing subsystem comprises a second clock.

3. The system of claim 1, wherein the network processing subsystem operates at a first clock rate, and wherein the security processing subsystem operates at a second clock rate.

4. The system of claim 1, further comprising a memory bus shared by at least one network processing engine of the network processing subsystem and at least one security processing engine of the security processing subsystem.

5. The system of claim 1, wherein the network processing subsystem and security processing subsystem are coupled via an Ethernet interface.

6. The system of claim 5, further comprising an Ethernet switch managing packet flow between the network processing subsystem and security processing subsystem.

7. The system of claim 1, further comprising a fabric interconnect interface coupled to at least one of the network processing subsystem and the security processing subsystem.

8. The system of claim 1, further comprising a single card supporting the network processing subsystem and the security processing subsystem.

9. The system of claim 1, wherein the plurality of interconnected security processing engines are configured in a corresponding plurality of parallel processing pipelines.

10. An appliance, comprising:
a chassis;
one or more physical communication interfaces positioned on a portion of the chassis;
a network processing subsystem positioned within the chassis and coupled to the one or more physical communication interfaces, comprising a plurality of interconnected network processing engines configured in a single pipeline;
a security processing subsystem positioned within the chassis, coupled to and external from the network processing subsystem, comprising a plurality of interconnected security processing engines; and
wherein the network processing subsystem and the security processing subsystem are supported on a single card; and
a second network processing subsystem and a second security processing subsystem, supported on a second single card and coupled to the one or more physical communication interfaces via the communications backplane.

11. The appliance of claim 10, further comprising a communications backplane positioned within the chassis, and wherein the network processing subsystem is coupled to the one or more physical communication interfaces via the communications backplane.

12. The appliance of claim 10, further comprising a fabric switch positioned within the chassis, the fabric switch managing packet flow across the communications backplane.

13. The appliance of claim 10, wherein the network processing subsystem operates at a first clock rate, and wherein the security processing subsystem operates at a second clock rate.

14. The appliance of claim 10, further comprising a memory bus shared by at least one network processing engine of the network processing subsystem and at least one security processing engine of the security processing subsystem.

15. The appliance of claim 10, wherein the network processing subsystem and security processing subsystem are coupled via an Ethernet or fabric interface.

* * * * *